(12) United States Patent
Hamberger et al.

(10) Patent No.: US 10,428,958 B2
(45) Date of Patent: Oct. 1, 2019

(54) VALVE WITH AN ALTERNATING SEAT SYSTEM

(71) Applicant: KSB Aktiengesellschaft, Frankenthal (DE)

(72) Inventors: Mario Hamberger, Frankenthal (DE); Andreas Walberer, Frankenthal (DE); Christian Wierling, Frankenthal (DE)

(73) Assignee: KSB Aktiengesellschaft, Frankenthal (DE)

( * ) Notice: Subject to any disclaimer, the term of this patent is extended or adjusted under 35 U.S.C. 154(b) by 0 days.

(21) Appl. No.: 15/516,903

(22) PCT Filed: Oct. 7, 2015

(86) PCT No.: PCT/EP2015/073100
§ 371 (c)(1),
(2) Date: Apr. 5, 2017

(87) PCT Pub. No.: WO2016/058874
PCT Pub. Date: Apr. 21, 2016

(65) Prior Publication Data
US 2017/0299066 A1    Oct. 19, 2017

(30) Foreign Application Priority Data
Oct. 13, 2014  (DE) .................. 10 2014 220 675

(51) Int. Cl.
*F16K 27/02*  (2006.01)
*F16K 1/42*  (2006.01)

(52) U.S. Cl.
CPC .............. *F16K 1/422* (2013.01); *F16K 1/427* (2013.01); *F16K 27/02* (2013.01)

(58) Field of Classification Search
CPC ....................................................... F16K 27/02
(Continued)

(56) References Cited

U.S. PATENT DOCUMENTS 3,813,079 A    5/1974  Baumann et al.
4,137,934 A    2/1979  Rice et al.
(Continued)

FOREIGN PATENT DOCUMENTS

CN    203453501 U    2/2014
CN    104048051 A    9/2014
(Continued)

OTHER PUBLICATIONS

German-language Search Report issued in counterpart German Application No. 10 2014 220 675.8 dated Jul. 29, 2015 with partial English translation (13 pages).
(Continued)

*Primary Examiner* — Marina A Tietjen
*Assistant Examiner* — Paul J Gray
(74) *Attorney, Agent, or Firm* — Crowell & Moring LLP

(57) ABSTRACT

A valve with removable components is provided. The valve includes a housing in which a seat is arranged between a flow inlet and a flow outlet. A shut-off body displaceable by a displacing element is arranged to shut off flow through the seat. The shut-off body displacing element is surrounded at least partially by a guide sleeve which is connected to the seat in a manner which allows the seat to be removed with the guide sleeve, shut-off body and shut-off body displacing element.

9 Claims, 5 Drawing Sheets

(58) Field of Classification Search
USPC .............. 137/315.27, 625.3, 625.33, 625.37
See application file for complete search history.

(56) References Cited

U.S. PATENT DOCUMENTS

| | | | |
|---|---|---|---|
| 4,493,338 A | | 1/1985 | Petursson |
| 4,773,442 A | | 9/1988 | Lephilibert |
| 5,255,704 A | | 10/1993 | Bennett |
| 2011/0309284 A1 | | 12/2011 | Yamada et al. |
| 2012/0112110 A1* | | 5/2012 | Lewandowski ....... F16K 5/0673 251/314 |
| 2014/0175311 A1 | | 6/2014 | Jamison et al. |
| 2014/0264135 A1 | | 9/2014 | Bell |
| 2014/0264138 A1 | | 9/2014 | Bell |

FOREIGN PATENT DOCUMENTS

| | | |
|---|---|---|
| DE | 2 224 269 | 6/1973 |
| DE | 28 08 094 A1 | 8/1978 |
| DE | 85 09 464 U1 | 7/1986 |
| DE | 10 2012 100 433 A1 | 7/2013 |
| EP | 0 177 397 B1 | 6/1989 |
| EP | 1 618 324 B1 | 9/2006 |
| EP | 1 898 006 A2 | 3/2008 |
| EP | 2 746 631 A1 | 6/2014 |
| GB | 2 447 267 A | 9/2008 |
| JP | 2014-129877 A | 7/2014 |

OTHER PUBLICATIONS

International Search Report (PCT/ISA/210) issued in PCT Application No. PCT/EP2015/073100 dated Jan. 20, 2016 with English translation (7 pages).
German-language Written Opinion (PCT/ISA/237) issued in PCT Application No. PCT/EP2015/073100 dated Jan. 20, 2016 (5 pages).
International Preliminary Report on Patentability (PCT/IB/373) issued in PCT Application No. PCT/EP2015/073100 dated Apr. 18, 2017, including English translation of document C3 (German-language Written Opinion (PCT/ISA/237)) previously submitted on Apr. 5, 2017 (Five (5) pages).
English translation of Chinese Office Action issued in counterpart Chinese Application No. 201580055385.4 dated Aug. 28, 2018 (four pages).
English translation of Chinese Office Action, including Search Report issued in counterpart Chinese Application No. 201580055385.4 dated Jan. 16, 2019 (eight (8) pages).
Japanese-language Office Action issued in counterpart Japanese Application No. 2017-519511 dated Jun. 11, 2019 with English translation (12 pages).

* cited by examiner

VALVE WITH AN ALTERNATING SEAT SYSTEM

CROSS REFERENCE TO RELATED APPLICATIONS

This application is a National Stage of PCT International Application No. PCT/EP2015/073100, filed Oct. 7, 2015, which claims priority under 35 U.S.C. § 119 from German Patent Application No. 10 2014 220 675.8, filed Oct. 13, 2014, the entire disclosures of which are herein expressly incorporated by reference.

BACKGROUND AND SUMMARY OF THE INVENTION

The invention relates to an valve having a housing in which a seat is arranged, wherein a shut-off body is arranged so as to be displaceable by an element for adjusting a flow.

Valves are also designated as shut-off members or actuators. They serve to block and open pipe lines to regulate fluid flows. A shut-off body unblocks a cross sectional flow area by way of a lift-off movement for adjusting a flow. In the closed position, the shut-off body closes the seat, which is frequently realized as a seat ring. The shut-off body is moved by an element and then unblocks a mostly ring-shaped flow opening. A valve stem or a spindle, for example, can be used in the case of the element for displacing the shut-off body. The seat is arranged in a housing of the valve and is mostly provided with a seal.

EP 0 177 397 B1 describes a valve faucet. An element is arranged so as to be translationally movable along the axis of the faucet. A shut-off body is situated on one end of said element. The valve seat is formed by a ring-shaped part.

EP 1 618 324 B1 describes an valve with a housing, said valve includes a shut-off body which is movable back and forth, is guided in a cage during its movements back and forth and is provided with openings.

DE 28 08 094 shows a valve with a valve insert where the seat is able to be replaced in a simple manner.

DE 2 224 269 shows a pressure reducing valve with an insert body which is sealed against the valve housing.

US 2014/0264138 A1 shows a valve with an insert body where the seat is installable using a special tool.

The openings serve for bringing the inlet passage into communication with the outlet passage in the open position of the shut-off body. The valve has a valve seat which is provided to interact with the shut-off body in the closed position thereof In addition, the valve comprises a counter seat with support on part of the housing. A seal is enclosed between the seat and the counter seat.

In the case of conventional valves, replacing the valve seat is frequently very expensive and time-consuming. In the majority of cases, special tools are necessary to do this. The assembly of the valve seat is also expensive and time-consuming on account of the mostly high number of parts. In addition, there is the risk of mistakes such that in the case of conventional valves, errors occur during assembly and reliable sealing is not ensured.

It is the object of the invention to provide an valve where the seat is able to be replaced in a simple manner. In addition, the assembly of the seat is to be made easier and mistakes avoided. In this case, the valve is to be distinguished by an inexpensive method of production and should be as low-maintenance as possible.

According to the invention, the element which moves the shut-off body is surrounded at least in part by a guide sleeve. The guide sleeve comprises a connection to the seat. In this case, this is preferably a non-positive locking connection. In the case of a particularly favorable variant, this is a threaded connection.

The guide sleeve is inserted into a bore in the housing and surrounds the rod-like element which moves the shut-off body. The guide sleeve can be pulled out of the bore, as a result of the connection according to the invention between the guide sleeve and the valve seat, the valve seat also being pulled out of the bore at the same time. When the seat is inserted, first of all the connection between the guide sleeve and the valve seat is produced and then the guide sleeve is inserted into the bore together with the valve seat.

The shut-off body is arranged at least in part in the guide sleeve. In this case, the guide sleeve comprises an opening for the flow. If the shut-off body is moved out of its valve seat by the element, which is realized, for example, as a spindle, a cross sectional flow area is unblocked, through which the fluid flows and passes through the opening in the guide sleeve to an outlet channel. In the case of an advantageous variant of the invention, the guide sleeve communicates with an intermediate piece. The intermediate piece is arranged at least in part outside the housing. It preferably projects, in this case, by way of a portion into the bore of the housing, in which bore the guide sleeve is arranged. A positive locking connection preferably exists between the guide sleeve and the intermediate piece. To this end, the intermediate piece can comprise indentations in which the guide sleeve engages in part. This can be realized as a result of pressing webs in the component.

The connection according to the invention between the guide sleeve and the intermediate piece enables the insertion of a sealing element. In addition, it is possible to remove the entire train out of the housing by pulling on the intermediate piece. The positive locking connection between the guide sleeve and the intermediate piece additionally ensures anti-rotation protection. The tabs in the guide pipe, which engage in indentations in the intermediate piece, ensure the anti-rotation protection. In this case, installation is preferably possible only in one orientation. This is, consequently, a positive locking connection which is achieved according to the invention without any further components and ensures anti-rotation protection.

A sealing element, which comprises a connection to the seat, is preferably arranged on the seat. In this case, this is preferably a positive locking connection. This can be realized, for example, by an undercut. Such an undercut also makes it possible for the sealing element to be pulled out reliably. In the non-pressed state, the seal can comprise a different form, for example a rectangular cross section, which does not initially fill out the undercut. The seal is made to change its form only by being pressed onto the seat.

When the seal is attached, it is slid onto the valve seat. As a result, the sealing element can be used without additional parts. The seal is pressed into a relief. Other geometries of the relief are also conceivable in this case. According to the invention, removal is possible without additional parts. The shear force of the sealing element is sufficient in this case.

The seat preferably comprises a recess for the sealing element.

In the case of conventional valves according to the prior art, the seal is chambered. In the case of the valve according to the invention, no further element around the seal is necessary. This implies considerable advantages as regards production.

Other objects, advantages and novel features of the present invention will become apparent from the following

DETAILED DESCRIPTION

Figure 1:
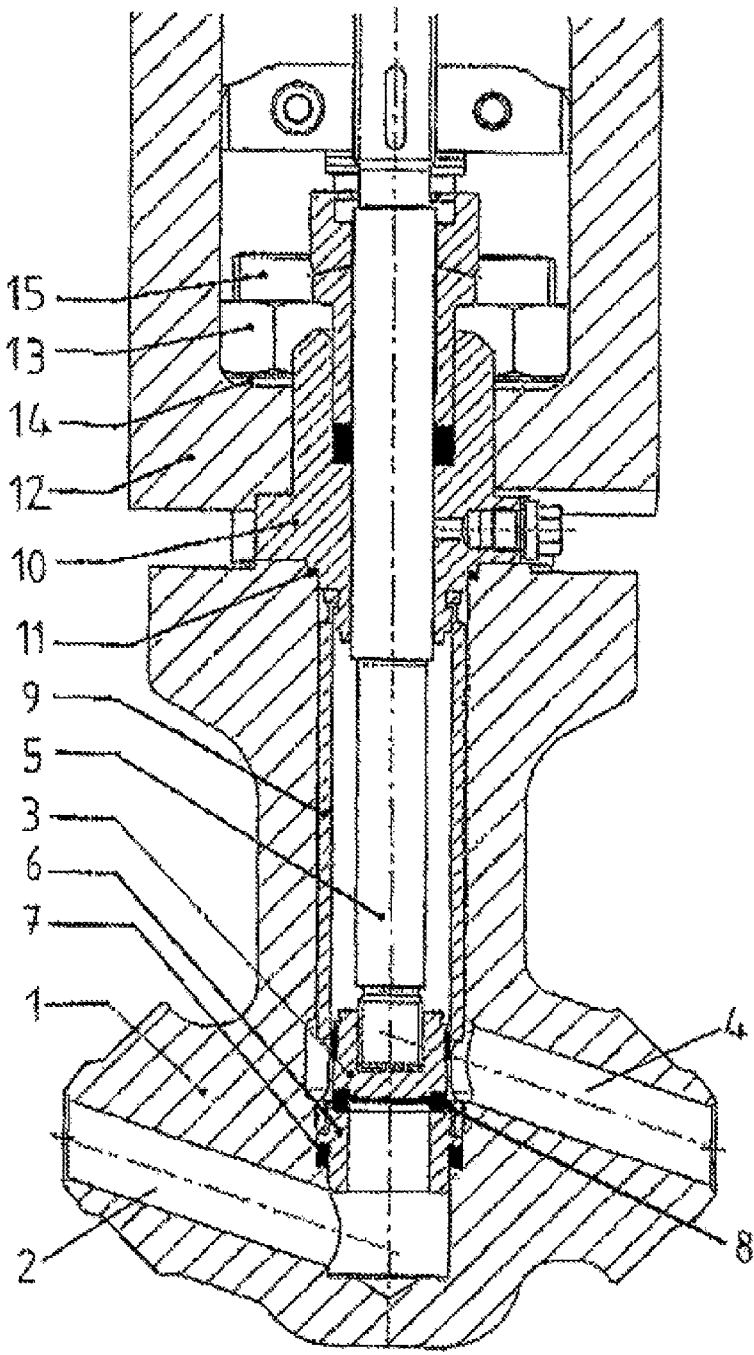
FIG. 1 shows a sectional drawing through part of a valve in accordance with an embodiment of the present invention.

FIG. 1 shows a detail of a sectional representation of an valve which comprises a housing 1. The fluid flows through an inflow passage 2. A shut-off body 3 is displaced by a translational movement and unblocks a cross sectional flow area, through which the fluid flows and passes to an outflow passage. In this embodiment, the shut-off body 3 is realized in a cylindrical manner.

The translational movement of the shut-off body 3 is effected by a rod-like element 5 which is designed as a spindle in this embodiment. The element 5 communicates with an actuating drive, which is not shown in FIG. 1, and moves the element 5 up or down in the vertical direction. As an alternative to this, a hand wheel can also be used for actuation. In this embodiment, the shut-off body 3 comprises an opening in which the element 5 engages, there being a non-positive locking connection between the shut-off body 3 and the element 5. As an alternative to the variant shown, the shut-off body 3 and the element 5 can also be integrally formed such that the shut-off body 3 and the element 5 are realized in one piece.

A seat 6 is arranged in the housing 1. The seat 6 is realized in a ring-shaped manner and interacts with the shut-off body 3 in the closed position thereof. A sealing element 7 is arranged between the ring-shaped seat 6 and the housing 1. The sealing element 7 is realized in a ring-shaped manner. A sealing element 8 ensures the sealing between the shut-off body 3 and the seat 6 in the closed position.

The element 5, which moves the shut-off body 3, is surrounded by a guide sleeve 9. The guide sleeve 9 serves as a spacer sleeve and communicates with an intermediate piece 10. A sealing element 11 creates a seal between the housing 1 and the intermediate piece 10.

The intermediate piece 10 comprises an inner opening in which the element 5 is displaceably arranged. The intermediate piece 10 engages in an opening of a component 12, which is realized as a bracket in this embodiment. The intermediate piece 10 is surrounded by a nut 13 in its upper region. A disc 14 is arranged between the nut 13 and the component 12, which is realized as a bracket.

A screw 15 is arranged above the nut 13.

Figure 2:
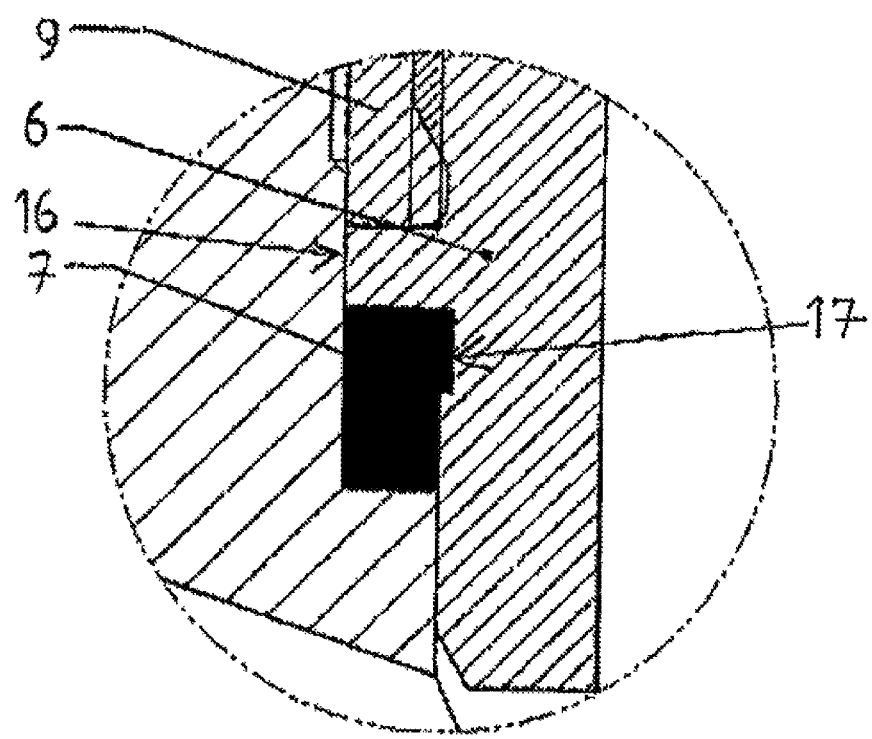
FIG. 2 shows an enlargement of a detail of a region of the valve seat in FIG. 1.

FIG. 2 shows an enlargement of a detail of a region of the valve seat. According to the invention, the guide sleeve 9 extends up to the seat 6 and comprises a connection to the ring-shaped seat 6. To this end, the guide sleeve 9 is provided in its lower region with an internal thread which engages in an external thread of the ring-shaped seat 6.

The ring-shaped seat 6 comprises a projection 16. The projection 16 extends along the circumference of the seat 6. In addition, the ring-shaped seat 6 comprises a recess 17 which extends as a groove along the circumference of the ring-shaped seat 6. As a result of said design, a positive locking connection is generated between the seat 6 and the sealing element 7, which is realized by the undercut.

When attaching the sealing element 7, the sealing element 7 is slid onto the ring-shaped seat 6. According to the invention, the sealing element 7 can be used without additional parts. The sealing element 7 is pressed into the relief by the screw 15. Other geometries of the relief are conceivable. The design according to the invention enables disassembly without additional parts. The shear force of the sealing element 7 is sufficient for this. In the non-pressed state, the sealing element 7 has a rectangular cross section and does not fill out the undercut. The sealing element 7 is not forced into a shape change until it is pressed over the seat 6.

Figure 3:
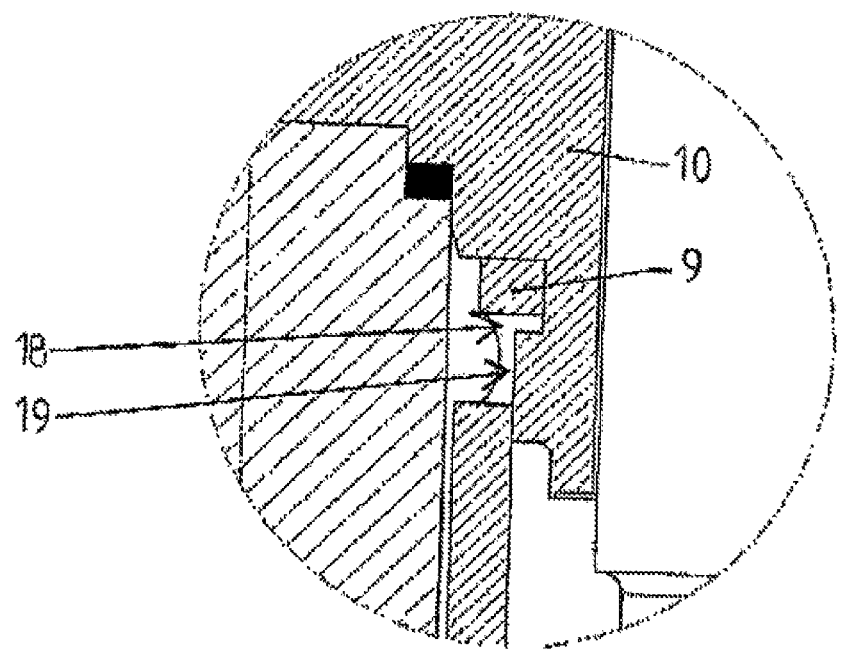
FIG. 3 shows an enlargement of a detail of a region of the FIG. 1 guide sleeve when interacting with the intermediate piece.

FIG. 3 shows an enlarged detail of the upper region of the guide sleeve 9. According to the invention, the guide sleeve 9 comprises a connection to the intermediate piece 10. In this case, this is a positive locking connection. Tabs, which are pressed into indentations in the intermediate piece 10, are realized in the guide sleeve 9 in this embodiment. The intermediate piece 10 comprises, for this purpose, a recess 18 which extends as a groove in a ring-shaped manner along the circumference of the intermediate piece 10. In addition, the intermediate piece 10 comprises a projection 19 which extends in a ring-shaped manner along the circumference.

The positive locking connection between the guide sleeve 9 and the intermediate piece 10 is realized as a result of pressing webs. In combination with the non-positive locking connection between the guide sleeve 9 and the seat 6 and the positive locking connection between the seat 6 and the sealing element 7, the complete train is able to be pulled out of the housing 1 as a result of pulling on the intermediate piece 10.

The rotating of the alternating system is realized by the positive locking connection between the guide sleeve 9 and the intermediate piece 10. Installation is only possible in one orientation. Exchanging the alternating seat system is possible in the shortest time without the aid of the special tools. In contrast to conventional systems, parts are clamped in this case and the assembly is designed in a simpler and additionally non-confusable manner.

The connection between the guide sleeve 9 and the intermediate piece 10 makes it possible for the sealing element 7 to be inserted and the sealing element 7 to be removed. The connection is realized with anti-rotation protection.

Figure 4:
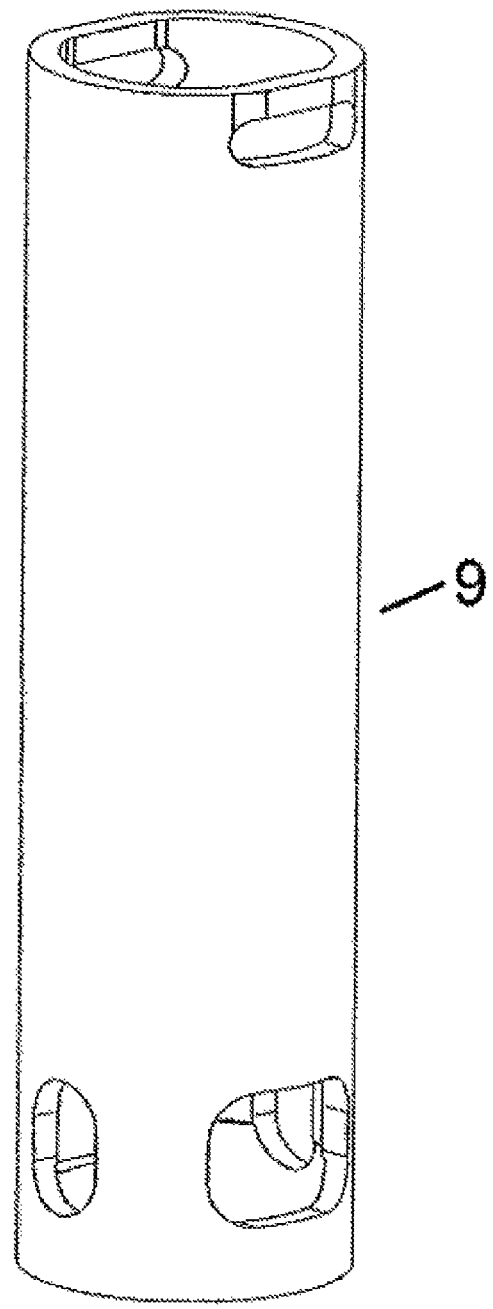
FIG. 4 shows a perspective representation of the FIG. 1 guide sleeve.

FIG. 4 shows a perspective representation of the upper region of the guide sleeve 9. According to the invention the guide sleeve 9 comprises tabs.

Figure 5:
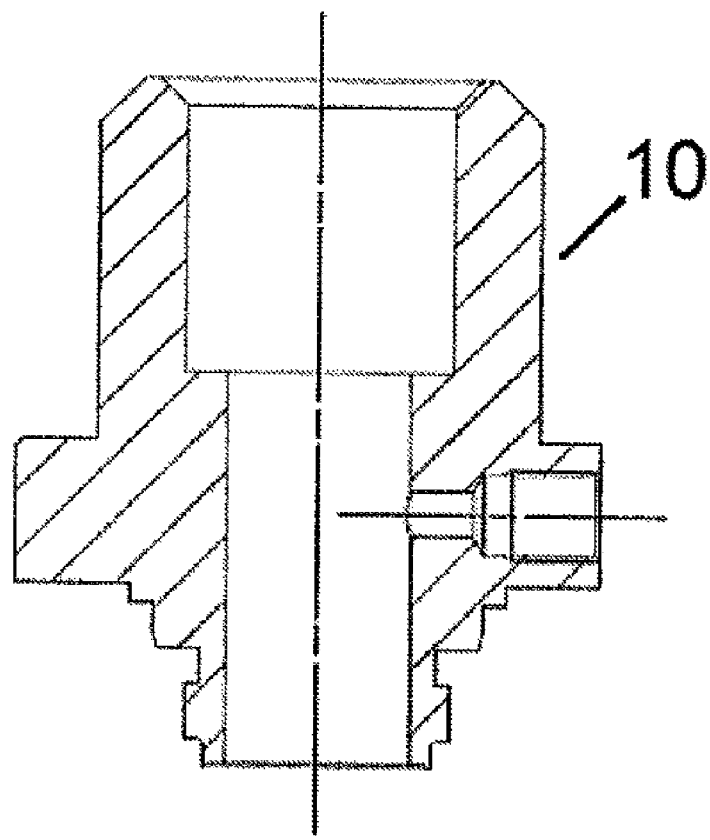
FIG. 5 shows a perspective representation of the FIG. 1 intermediate piece.

FIG. 5 shows a perspective representation of the intermediate piece 10. The tabs of the guide sleeve 9 engage in indentations of the intermediate piece 10 such that a positive locking connection is generated.

In the case of an alternative variant of the invention which is not shown, the seat 6 and the guide sleeve 9 are realized integrally with one another.

In the case of another variant which is not shown, the seat 6, the guide sleeve 9 and the intermediate piece 10 are realized integrally with one another.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A valve, comprising:
    a housing having a flow inlet and a flow outlet;
    a seat located in the housing;
    a shut-off body configured to be displaced relative to the seat to adjust a flow from the flow inlet to the flow outlet passing through the seat;
    a shut-off body displacing element configured to control displacement of the shut-off body relative to the seat; and
    a guide sleeve arranged in the housing to surround at least in part the shut-off body displacing element
    wherein
        the guide sleeve is configured to be connected to the seat in a manner which permits the seat to be removed from the housing with the guide sleeve when the guide sleeve is removed from the housing;
        the seat includes a recess configured to receive a sealing element configured to seal axially between the housing and an outer surface of the seat when the seat is in an installed position in the housing,
        the recess includes an undercut configured to receive the sealing element in a releasable connection which resists sealing element self-release, and
        the housing and the seat are configured such that when the seat is installed into the housing the sealing element is axially compressed between mutually opposing axially-facing surfaces of the housing and the seat and conforms to a shape of the recess between the housing and the seat.

2. The valve as claimed in claim 1, wherein
the guide sleeve includes a non-positive locking connection to the seat.

3. The valve as claimed in claim 2, wherein
the non-positive locking connection is a threaded connection.

4. The valve as claimed in claim 1, further comprising
an intermediate piece configured to cooperate with an end of the guide sleeve axially opposite an end of the guide sleeve adjacent to the shut-off body.

5. The valve as claimed in claim 4, wherein
the intermediate piece is arranged at least in part outside the housing.

6. The valve as claimed in claim 5, wherein
the guide sleeve is configured to engage the intermediate piece by positive locking.

7. The valve as claimed in claim 6, wherein
the intermediate piece includes indentations configured to positively lock the guide sleeve with the intermediate piece.

8. The valve as claimed in claims 7, wherein
the guide sleeve includes at least one opening configured to permit the flow to pass through the guide sleeve to the housing outlet.

9. The valve as claimed in claims 1, wherein
the guide sleeve includes at least one opening configured to permit the flow to pass through the guide sleeve to the housing outlet.

* * * * *